Oct. 6, 1959 B. N. LINDER 2,907,044
COAT FRONT CONSTRUCTION AND METHOD OF MAKING
Filed April 4, 1958 2 Sheets-Sheet 1
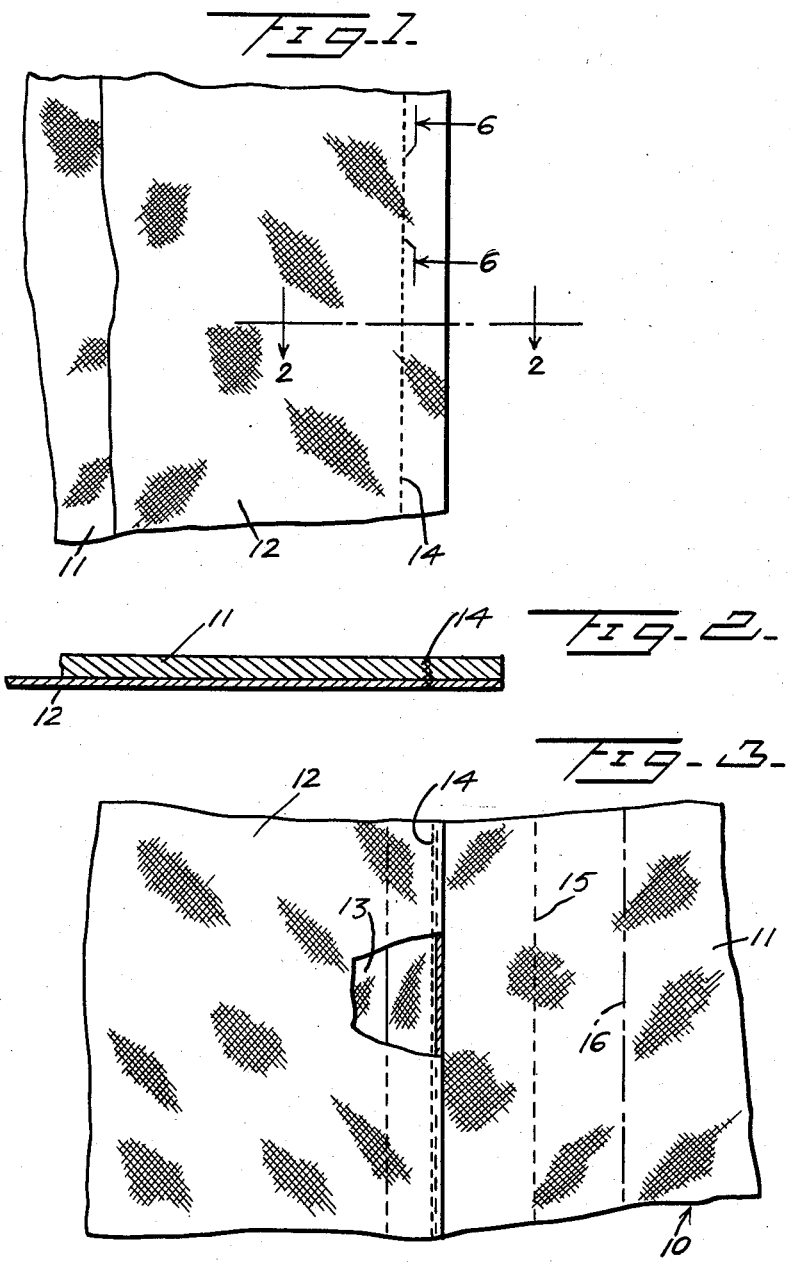
INVENTOR
Bertram N. Linder
BY Kimmel & Crowell
ATTORNEYS Oct. 6, 1959 B. N. LINDER 2,907,044
COAT FRONT CONSTRUCTION AND METHOD OF MAKING
Filed April 4, 1958 2 Sheets-Sheet 2
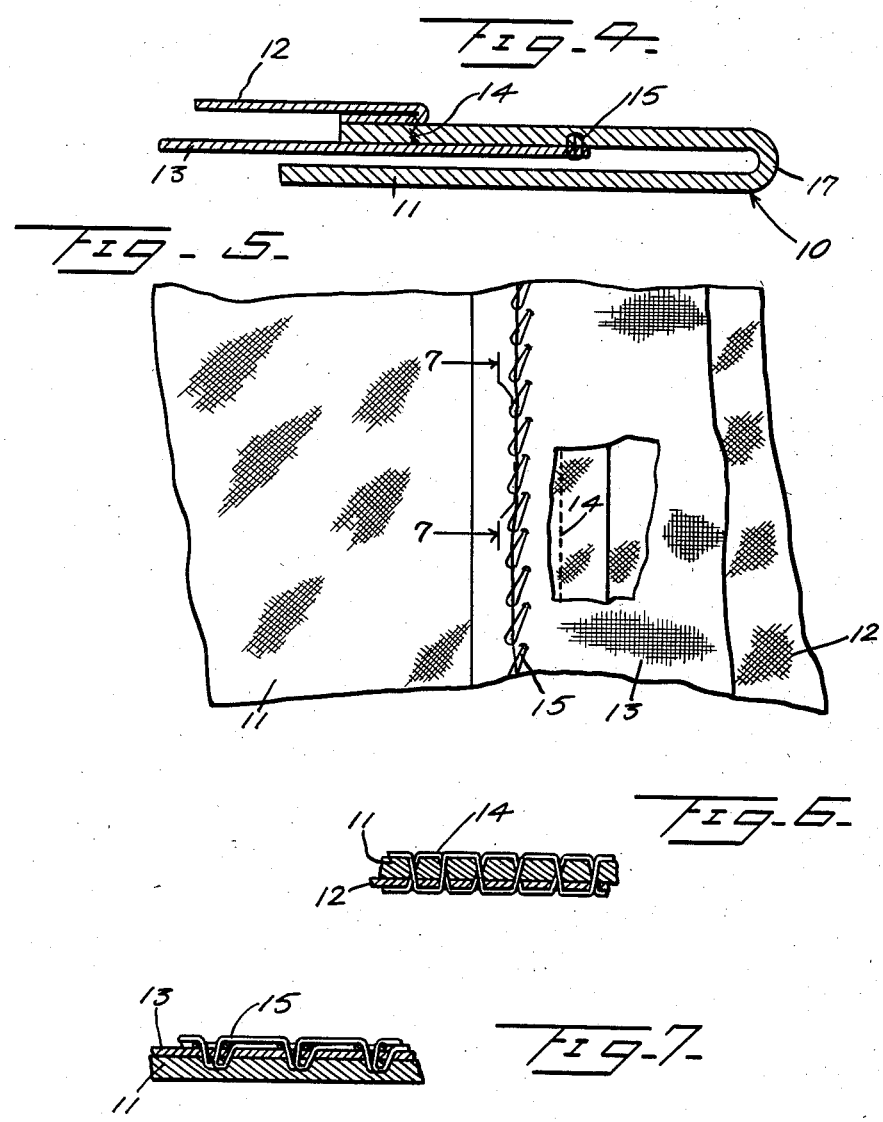
INVENTOR.
Bertram N. Linder
BY
Kimmel & Crowell
ATTORNEYS

United States Patent Office

2,907,044
Patented Oct. 6, 1959

2,907,044

COAT FRONT CONSTRUCTION AND METHOD OF MAKING

Bertram N. Linder, Dalton, Pa., assignor to Linder Brothers, Inc., Scranton, Pa., a corporation of Pennsylvania Application April 4, 1958, Serial No. 726,471

2 Claims. (Cl. 2—97)

The present invention relates to coat front constructions and methods of making same to eliminate bulky and unsightly seam structures.

The primary object of the invention is to provide a coat front and method of making same which produces a relatively smooth non-bulky edge portion of the coat.

Another object of the invention is to provide a coat front structure and method of making same which is simple to form, inexpensive to make, and which produces a coat front having a smooth front edge.

A further object of the invention is to provide a novel coat front and method of forming same which utilizes conventional stitching produced by conventional machinery without necessitating special tools or equipment.

Other objects and advantages will become apparent in the following specification when considered in the light of the attached drawings, in which:

Figure 1 is a fragmentary elevational view of the coat front and coat lining.

Figure 2 is an enlarged fragmentary transverse cross-section taken along the line 2—2 of Figure 1, looking in the direction of the arrows.

Figure 3 is a fragmentary elevational view of the coat front lining and interlining shown partially broken away and in cross-section for convenience of illustration.

Figure 4 is an enlarged fragmentary transverse cross-section of the edge portion of the coat front in completed form.

Figure 5 is an internal elevational view illustrating a construction step in the method, partially broken away and in section for convenience of illustration.

Figure 6 is an enlarged fragmentary vertical cross-section taken along the line 6—6 of Figure 1, looking in the direction of the arrows.

Figure 7 is an enlarged fragmentary vertical cross-section taken along the line 7—7 of Figure 5, looking in the direction of the arrows.

Referring now to the drawings in detail wherein like reference characters indicate like parts throughout the several figures, the reference numeral 10 indicates generally a coat front constructed in accordance with the invention and including the outer material 11, inner lining 12, and interlining 13.

In conventional coat constructions, the inner lining and the interlining are joined to the front edge of the outer material with a single row of stitching so that a rather bulky unsmooth edge is produced on the coat.

In the present invention, the inner lining 12 is joined to the outer material 11 by a row of stitching 14 formed on a conventional lock stitching machine. Seam 14 joins the inner lining 12 to the outer material 11 with their finished surfaces in contact with each other. After the seam 14 has joined the inner lining 12 to the outer material 11, the inner lining 12 is folded over the seam 14 and the interlining 13 is sewed to the inner surface of the outer material 11 by a line of stitching 15 arranged in spaced parallel relation to the line of stitching 14.

The line of stitching 15 is formed on a blind stitch machine which is specially adjusted so as to produce a loose stitch such that when shrunk or tightened in the steaming and finishing processes on the coat will tighten to hold the interlining 13 tightly to the outer material 11 without gathering.

After the interlining 13 is secured to the outer material 11 by the line of stitching 15, the outer material 11 is folded along the broken line 16 in Figure 3 to produce an edge 17, as seen in Figure 4, in spaced parallel relation to the seams 14 and 15.

Referring now particularly to Figure 4, it will be seen that the bulk from the seam 14 joining the inner lining 12 to the outer material 11 is spaced from the bulk of the seam 15 joining the interlining 13 to the outer material 11.

A coat constructed following the method set forth above will have a smooth non-bulky front edge with a complete absence of unsightly ridges and bumps.

Having thus described the preferred embodiment of the invention, it should be understood that numerous structural modifications and adaptations, as well as modifications in the procedural steps of the method, may be resorted to without departing from the scope of the appended claims.

What is claimed is:

1. A coat front structure comprising an outer material panel folded to form a front facing, an interlining panel sewed to said facing along a line parallel to said fold and spaced therefrom, said interlining panel having its terminal edge portion positioned between said outer material panel and its facing portion, an inner lining secured by a lock stitch seam to the free edge of said facing portion along a line extending parallel to said folded edge and spaced therefrom an amount substantially greater than the space separating the securing line of the interlining panel therefrom, said inner lining being folded on itself to cover said lock stitch seam.

2. A device as claimed in claim 1 wherein said interlining is secured to said facing portion by a loose blind stitch.

References Cited in the file of this patent

UNITED STATES PATENTS

| | | |
|---|---|---|
| 2,316,387 | Albrecht | Apr. 13, 1943 |
| 2,571,255 | Kessler | Oct. 16, 1951 |